United States Patent
Xu et al.

(10) Patent No.: US 8,793,704 B2
(45) Date of Patent: Jul. 29, 2014

(54) TECHNIQUES TO MANAGE EVENT NOTIFICATIONS

(75) Inventors: LiHui Xu, Bellevue, WA (US); Satish Thatte, Redmond, WA (US); Rahul Kapoor, Bellevue, WA (US); Rolando Jimenez Salgado, Redmond, WA (US); Todd Abel, Nebraska, NE (US); Anuj Bansal, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1767 days.

(21) Appl. No.: 11/716,332

(22) Filed: Mar. 9, 2007

(65) Prior Publication Data

US 2008/0222654 A1 Sep. 11, 2008

(51) Int. Cl.
G06F 9/54 (2006.01)
G06F 17/30 (2006.01)

(52) U.S. Cl.
CPC ...................................... *G06F 9/542* (2013.01)
USPC .......................................... 719/318; 715/739

(58) Field of Classification Search
USPC ......................................................... 719/318
See application file for complete search history.

(56) References Cited

U.S. PATENT DOCUMENTS

| | | | |
|---|---|---|---|
| 5,903,568 A * | 5/1999 | Tanaka et al. | 370/469 |
| 5,951,638 A * | 9/1999 | Hoss et al. | 709/206 |
| 6,654,786 B1 | 11/2003 | Fox et al. | |
| 7,031,974 B1 * | 4/2006 | Subramaniam | 1/1 |
| 2002/0010803 A1 * | 1/2002 | Oberstein et al. | 709/318 |
| 2002/0038217 A1 * | 3/2002 | Young | 705/1 |
| 2003/0088433 A1 * | 5/2003 | Young et al. | 705/1 |
| 2003/0217111 A1 | 11/2003 | McKay | |
| 2004/0153453 A1 | 8/2004 | Brodie et al. | |
| 2004/0230661 A1 | 11/2004 | Rashid et al. | |
| 2005/0228803 A1 | 10/2005 | Farmer et al. | |
| 2006/0020716 A1 | 1/2006 | Suryanarayana | |
| 2006/0070083 A1 * | 3/2006 | Brunswig et al. | 719/318 |
| 2006/0168194 A1 | 7/2006 | Lake et al. | |
| 2006/0171383 A1 | 8/2006 | Davydov | |
| 2007/0240170 A1 * | 10/2007 | Surlaker et al. | 719/318 |
| 2007/0250545 A1 * | 10/2007 | Surlaker et al. | 707/201 |

OTHER PUBLICATIONS

"Building Office Business Applications—A new breed of business applications built on the 2007 Microsoft Office system", http://www.3sharp.com/pdf/Building_Office_Business_Applications.pdf, Jun. 2006.
"Benefits of Transformational Data Integration", http://www.treehouse.com/downloads/DataIntegrationWhitepaper.pdf, Copyright 2000.
"The Business Benefits of Integration", http://www.attachmate.com/NR/rdonlyres/7CFAC49D-8218-4784-9CFA-73AD8CA721C5/0/literature_bbintegrate.pdf, Copyright 2004.

* cited by examiner

*Primary Examiner* — Andy Ho
*Assistant Examiner* — Abdou Seye
(74) *Attorney, Agent, or Firm* — Thomas Wong; David Andrews; Micky Minhas

(57) ABSTRACT

Techniques to manage event notifications are described. An apparatus may comprise a server having an event notification component. The event notification component may have an event agent component to receive a message indicating a change event for line of business (LOB) data, and convert the change event to a defined LOB entity event. The event notification component may have a notification service component to generate a LOB event message for the entity event. The event notification component may have an event database to store the event message in a user event queue. Other embodiments are described and claimed.

20 Claims, 4 Drawing Sheets

200

```
┌─────────────────────────────────────────────┐
│ RECEIVE A MESSAGE INDICATING A CHANGE EVENT │
│          FOR LINE OF BUSINESS DATA          │
│                     202                     │
└─────────────────────────────────────────────┘
                      │
┌─────────────────────────────────────────────┐
│ CONVERT THE CHANGE EVENT TO A DEFINED LINE OF│
│            BUSINESS ENTITY EVENT            │
│                     204                     │
└─────────────────────────────────────────────┘
                      │
┌─────────────────────────────────────────────┐
│ SEND THE ENTITY EVENT TO A LINE OF BUSINESS │
│              NOTIFICATION SERVICE           │
│                     206                     │
└─────────────────────────────────────────────┘
                      │
┌─────────────────────────────────────────────┐
│ GENERATE A LINE OF BUSINESS EVENT MESSAGE FOR│
│               THE ENTITY EVENT              │
│                     208                     │
└─────────────────────────────────────────────┘
                      │
┌─────────────────────────────────────────────┐
│    STORE THE EVENT MESSAGE IN A USER EVENT QUEUE │
│                     210                     │
└─────────────────────────────────────────────┘
```

FIG. 2

TECHNIQUES TO MANAGE EVENT NOTIFICATIONS

BACKGROUND

Information workers frequently create, consume and update business objects or entity data stored in line of business (LOB) systems. In some cases, however, entity data is not readable programmatically by an external application. When entities do not support a read operation or the read operation returns partial data, applications which interact with these business objects must rely on data to be served by an external store. Further, even when an entity does support a read operation, it is more efficient to receive notifications from the LOB system regarding changes rather than continually reading it to detect them. The constraints arising from read-less business entities make it even more difficult for composite applications, where a user would complete a typical business task using several applications working on the same set of data. Consequently, there may be a substantial need for improvements in providing data to applications from a LOB system.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments may be directed to event notification techniques for a client-server system. In particular, some embodiments may be directed to event notification techniques for a LOB system. A LOB system may periodically change data for an office business entity (OBE). In one embodiment, such changes may be promoted to client devices via a server to the client devices. For example, a middle-tier LOB server may include an event notification component. The event notification component may comprise an event agent component, a notification service component, and an event database with a user event queue. The user event queue is typically a logical construct and not necessarily a physical queue. The event notification component may be arranged to receive a message indicating a change event for LOB data. The event notification component may convert the change event to a standard or defined LOB entity event known to the LOB client device. The notification service component may be arranged to generate a LOB event message (LEM) for the entity event. The event database may store the LEM in a user event queue for a given user. In this manner, the user may receive change events from the LOB system on one or more client devices for the user. Other embodiments are described and claimed.

BRIEF DESCRIPTION OF THE DRAWINGS

FIG. 2 illustrates one embodiment of a first logic flow.

DETAILED DESCRIPTION

Figure 1:
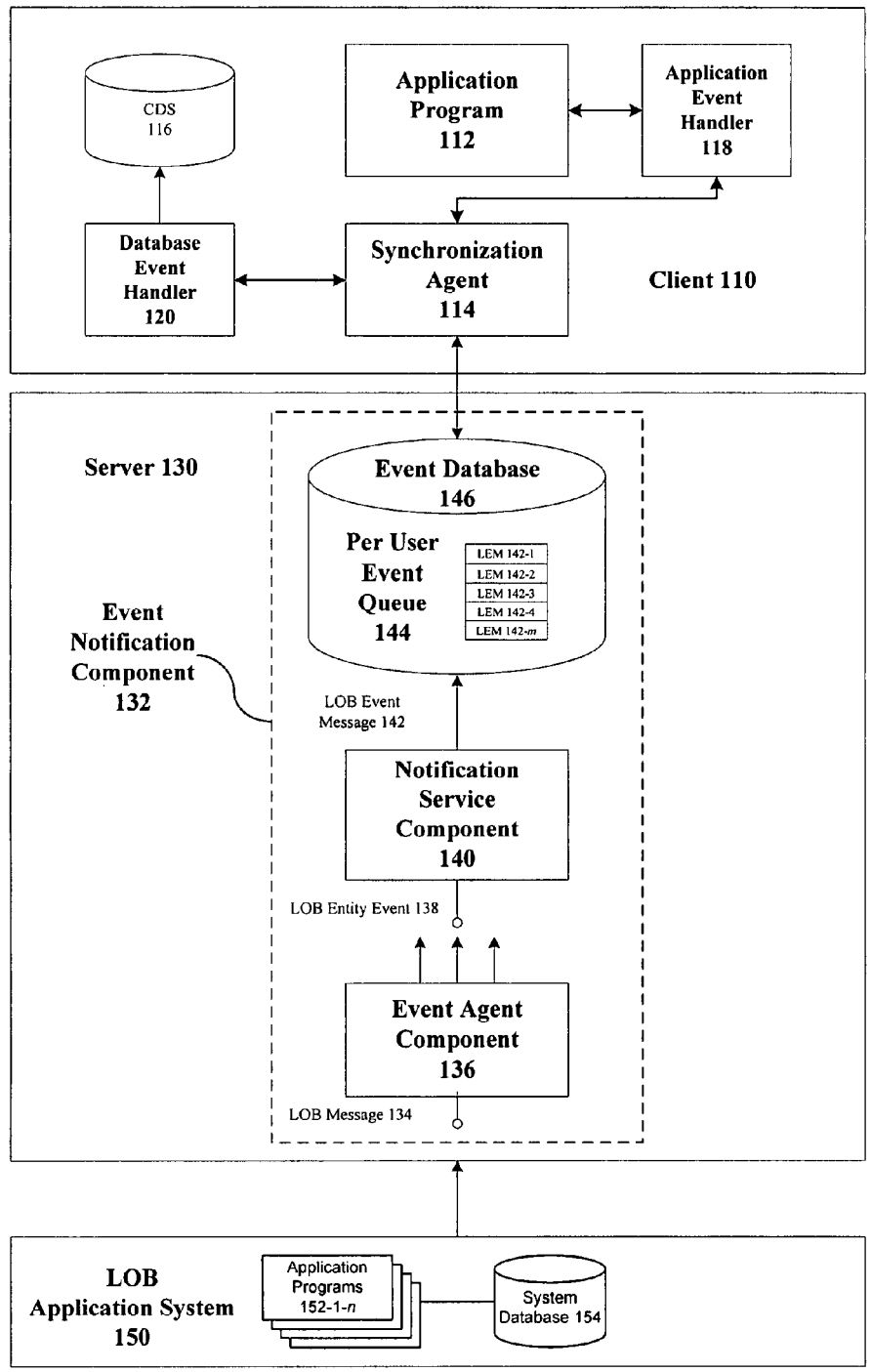
FIG. 1 illustrates one embodiment of an event notification system.

Various embodiments may be directed to event notification techniques for a LOB system. More particularly, some embodiments may be directed to event notification techniques for a LOB system implemented in a middle-tier LOB server. The LOB notification services implemented at the middle-tier provide functionality to allow a LOB system to indicate clients about relevant change events that have occurred at an LOB application system. The notification functionality at the middle-tier is supported by at least three delivery techniques. First, the middle-tier allows an LOB application system to queue notification in a user queue which can be later picked by clients. Second, the middle-tier allows an LOB application system to send an alert to the user via the middle-tier notification services. The alert may be implemented via electronic mail (email), instant message (IM), text message, page message, or any other messaging technique. To support backward compatibly with legacy clients, the middle-tier also allows user registration where users can be registered as various client types. Third, the middle-tier monitors the LOB application system for changes and generates the events based on changes that are occurring in the middle-tier. It may be appreciated that other suitable delivery techniques may work as well.

As previously described, information workers frequently create, consume and update business objects or entity data stored in LOB systems. It is a common scenario that some entity data is not readable programmatically by an external application for various reasons. For example, a proprietary implementation of the LOB system is incapable of providing read support for lower level objects. The objects are typically internal to the system and not exposed. In another example, a security model in the proprietary implementation of the LOB system typically controls read access to the objects. In yet another example, a business object as defined by the client applications that make use of it typically has additional data that the LOB system does not store. In still another example, a business object could be a composite from one or more LOB application systems. In the case of a single LOB, it could be a composite of one or more LOB objects that form a business entity. The same can be applied to multiple LOB systems where the object is composited across objects from multiple LOBs. In either case the notification is typically not be generated until multiple changes from multiple objects have occurred When entities do not support a read operation or the read operation returns partial data, applications which interact with these business objects must rely on data to be served by an external store. Unless this external store is provided, the data will not be available after the application creates it or receives it via a push from the LOB system. Another challenge presented is that the data is only available with the application that receives the push. The pushed data will not be visible to another application that shares the exact same entity for the same user. The constraints arising from read-less business entities make it even more difficult for composite applications, where a user would complete a typical business task using several applications working on the same set of data. Various embodiments attempt to solve these and other problems.

FIG. 1 illustrates one embodiment of an event notification system 100. The event notification system 100 may be suitable for implementing event notification techniques for an LOB system. As shown in FIG. 1, the event notification system 100 includes a client 110, a server 130 and a LOB application system 150. It may be appreciated that the event notification system 100 may comprise more or less elements as desired for a given implementation. The embodiments are not limited in this context.

As used herein the terms "component" and "system" are intended to refer to a computer-related entity, either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In various embodiments, the event notification system 100 may include the LOB application system 150. A LOB system generally includes various LOB application programs typically implemented on enterprise hardware platforms for a business entity. LOB application programs are application programs designed to provide various business application services. Examples of LOB application programs may include a Customer Relationship Management (CRM) application program, an Enterprise Resource Planning (ERP) application program, a Supply Chain Management (SCM) application program, and other business application programs using business-oriented application logic. The LOB data for the various LOB application programs may be stored in various elements throughout a LOB system, including a middle-tier LOB server and multiple LOB client devices. Consequently, whenever a change to LOB data is made by an LOB application program, there may be a need to promote the change event to other LOB system elements. Accordingly, various embodiments are directed to techniques for providing event notification techniques that allow a LOB system to propagate changes to LOB data throughout various physical and logical devices for the LOB system.

In various embodiments, the LOB application system 150 may comprise an enterprise hardware platform for a business entity suitable for storing and executing the LOB application programs 152-1-$n$ to create, read, update, delete, query or otherwise process LOB data stored in a system database 154. The LOB application system 150 may be implemented on any hardware and/or software platform as described for the client 110 and the server 130, as well as others. The embodiments are not limited in this context.

In various embodiments, the LOB application system 150 may comprise one or more LOB application programs 152-1-$n$. Examples of LOB application programs 152-1-$n$ may include but are not limited to a CRM application program, an ERP application program, a SCM application program, and any other business application programs using business-oriented application logic. The LOB application programs 152-1-$n$ may store LOB data in a system database 154.

In various embodiments, the event notification system 100 may include one or more clients 110. The client 110 may comprise any client device or client system arranged to use or process LOB data for one or more LOB application programs 152-1-$n$ of the LOB application system 150. Examples for client 110 may include but are not limited to a processing system, computer, server, work station, appliance, terminal, personal computer, laptop, ultra-laptop, handheld computer, personal digital assistant, consumer electronics, television, digital television, set top box, telephone, mobile telephone, cellular telephone, handset, wireless access point, base station, subscriber station, mobile subscriber center, radio network controller, router, hub, gateway, bridge, switch, machine, or combination thereof. In one embodiment, for example, the client 110 may be implemented as an LOB client device, application or system.

In various embodiments, the client 110 may include an application program 112. Examples of the application program 112 may include but are not limited to application programs that are part of a MICROSOFT® OFFICE suite of application programs, such as a MICROSOFT OUTLOOK application program, for example. The MICROSOFT OUTLOOK application program is a personal information manager. Although often used mainly as an electronic mail (email) application, it also provides other application services such as calendar, task and contact management, note taking, and a journal. Application programs 110 can be used as stand-alone applications, but can also operate in conjunction with a server-side application, such as a MICROSOFT EXCHANGE server to provide enhanced functions for multiple users in an organization, such as shared mailboxes and calendars, public folders and meeting time allocation. Client data for the MICROSOFT OUTLOOK application program may be stored in an OUTLOOK client database or data store (not shown).

In various embodiments, the application program 112 may be communicatively coupled to a synchronization agent 114. The client 110 may further comprise an application event handler 118 communicatively coupled to the application program 112, and a database event handler 120 communicatively coupled to a Client Data Store (CDS) 116. Both handlers 118, 120 may be communicatively coupled to a synchronization agent 114.

In various embodiments, the event notification system 100 may include one or more servers 130. The server 130 may any comprise any server device or server system arranged to use or process LOB data for one or more of the LOB application programs 152-1-$n$ of the LOB application system 150. Examples for the server 130 may include but are not limited to a processing system, computer, server, work station, personal computer, desktop computer, and so forth. The embodiments are not limited in this context. In one embodiment, for example, the server 130 may be implemented as a middle-tier LOB server.

In various embodiments, the server 130 may include an event notification component 132. The event notification component 132 may further comprise an event agent component 136 communicatively coupled to a notification service component 140. The notification service component 140 may store LOB event messages 142-1-$m$ in a user event queue 144 maintained in an event database 146. It may be appreciated that the user event queue 144 typically represents a logical construct and not necessarily a physical queue.

In general operation, the event agent component 136 for the event notification component 132 implemented by the server 130 may arranged to receive a LOB message 134 indicating a change event for LOB data stored by the system database 154 of the LOB application system 150. The event notification component may convert the change event from the LOB message 134 to a standard or defined LOB entity event 138. The LOB entity event 138 may be known to the LOB client device 110. The notification service component 140 may receive the LOB entity event 138 from the event agent 136, and generates a LOB event message (LEM) 142 representing the entity event 138. The event database 146 may store multiple LEM 142-1-$m$ in a user event queue 144 for a given user of the client 110. In this manner, the user may receive change events from the LOB application system 150 on one or more client devices 110 for the user.

In various embodiments, the client 110 may receive the LEM 142-1-m in a number of different ways. For example, the notification service component 140 may notify the client 110 of the LEM 142-1-m. The client 110 may then retrieve the LEM 142-1-m from the user event queue 144 of the event database 146. In another example, the client 110 may periodically or aperiodically request any LEM 142-1-m from the event notification component 132. The notification service component 140 may be arranged to send the LEM 142-1-m to the client 110 in response to the request received from the client 110. In yet another example, the notification service component 140 may be arranged to send the LEM 142-1-m to the client 110 as an electronic mail (email) message.

In various embodiments, the client 110 may receive and process the LEM 142-1-m in a number of different ways. For example, the application program event handler 118 may be arranged to process the LEM 142-1-m for the application program 112 residing on the client 110. In another example, the database event handler 120 may be arranged to process the LEM 142-1-m for the CDS 116 residing on the client 110.

Operations for the event notification system 100 may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more elements of the event notification system 100 or alternative elements as desired for a given set of design and performance constraints.

FIG. 2 illustrates a logic flow 200. The logic flow 200 may be representative of the operations executed by one or more embodiments described herein. As shown in FIG. 2, the logic flow 200 may receive a message indicating a change event for line of business data at block 202. The logic flow 200 may convert the change event to a defined line of business entity event at block 204. The logic flow 200 may send the entity event to a line of business notification service at block 206. The logic flow 200 may generate a line of business event message for the entity event at block 208. The logic flow 200 may store the event message in a user event queue at block 210. The embodiments are not limited in this context.

For example, the logic flow 200 may receive a message indicating a change event for line of business data at block 202. The change event may represent or signal a change in the LOB data stored by the system database 154 of the LOB application system 150. The LOB application system 150 initiates the chain of LOB event notification operations by submitting a LOB message 134 about a change.

When the event agent component 136 receives the LOB message 134 from the LOB application system 150, the event agent component 136 converts the change event to a defined line of business entity event at block 204. Since there are many different types of LOB application programs 152-1-n that may be implemented for the LOB application system 150, including customized solutions, the event agent component 136 may comprise a customized interface component having event agent logic to listen for the LOB message 134, and retrieves the change event information from the LOB message 134. The change event information for each LOB application program 152-1-n, however, may have very different data schemas, syntax rules, formatting, or protocols. Consequently, the event agent component 136 may be arranged to convert the proprietary data schemas for the change event information into standardized events for a LOB entity that are understandable by all the LOB elements in the event notification system 100, particularly the client 110. For example, a LOB request to an extension would allow LOB to post a message to a LOB adapter for the extension, and have listeners registered with the adapter for the extension to "convert the incoming message to a LOB event entity.

Once the event agent 136 converts the LOB message 134 to a standard LOB event entity 138, the event agent 136 may send the LOB event entity 138 to the notification service component 140. The notification service component 140 creates a LEM 142, and stores the LEM 142 in the user event queue 144 of the event database 146.

The synchronization agent 114 of the client 110 may pick up all the pending LEM 142-1-m for the user from the user event queue 144. The database event handler 120 for a CUD event type creates an instance of cacheable business data units, such as creating an "Entity View" instance in the CDS 116 if there is none, or alternatively, it may update or delete an existing one. Instances of cacheable business data units may refer to any unit of business data that can be uniquely identified, stored and transferred. Examples of such instances may include entity instances, view instances, and so forth. For a Non-CUD event, the application event handler 118 on the client 110 processes each of the received LEM 142-1-m.

The various embodiments may be further illustrated using specific implementation examples. For example, the event notification component 132 may be implemented as an application program interface (API) named NotifyUser as a web service on a middle-tier hosted on a MICROSOFT SHAREPOINT Web Front End (WFE). The WFE can provide the NotifyUser service as an API object model as well as a web service. The NotifyUser web service will be built on top of a NotifyUser object model. The LOB application system that wants to notify LOB clients can invoke the NotifyUser web service. The NotifyUser service provides the ability to queue notifications at the middle-tier that are later picked up by a LOB client, or alternatively, send an email to a user.

In the event that the NotifyUser web service is not compatible with a given LOB client, the middle-tier can host a LOB compatible web service using a "Custom Notification Endpoint" feature. The LOB compatible custom notification endpoint (e.g., the LOB event agent 136) can be authored by system integrators or system vendors. The custom notification endpoint will invoke the middle-tier NotifyUser object model to use middle-tier notification services. Custom notification endpoints can be built using "EWS Designer tool/ Windows Workflow Designer" and exposed as a web service or regular web service using ASMX files.

Various embodiments may utilize a LOBi_Event_Message table. This table is used to store the notification messages. The LOBi_Event_Message may include a MessageId which is the column of type INT and is the primary key for this table. This is also an identity. The LOBi_Event_Message may include an EventType which is the column of type NVARCHAR(64) and represents the event type. This is a NOT NULL column. The LOBi_Event_Message may include an EventPayLoad which is the column of type NVARCHAR(MAX) and represents the event payload. This is a NULL column. The LOBi_Event_Message may include an EventReceiveTime which is the column of DATETIME and represents the time when the event was received.

Various embodiments may utilize a LOBi_Message_Receipients table. This table is used to store the relationship between a message and their intended recipients. The LOBi_Message_Receipients includes a MessageId which is the column of type INT and is a foreign key to the LOBi_Event_Message. The LOBi_Message_Receipients includes a MessageId and a Recipient. The Recipient is the column of type NVARCHAR(64) and is the user account.

In various embodiments, each notification event will be bound to one or more users. An example of pseudocode for the NotifyUser API is illustrated as follows:

```
public class User
{
    public {get, set} string DomainUser;
    public {get, set} string Email;
    public {get, set} string CN;
}
public void NotifyUser(User[ ] users, string eventType,
string eventPayLoad)
{
    Step 1. if (users == null || users.Length == 0 )
    {
        Error.
    }
    Step 2. if (eventType == null || eventType == WHITE_SPACE )
    {
        Error.
    }
    Step 3. Check all users are VALID
    {
        Error if not all users are valid.
    }
    Step 4. if ( eventType == Event_EMAIL )
    {
        if not VALID eventPayLoad, Error
    }
    Step 5. if ( eventType == Event_EMAIL )
    {
        Call SendEmail
    }
    else
    {
        EnQueue(users[ ].UserAccount, eventType, eventPayLoad)
    }
}
```

In various embodiments, the event notification component 132 may determine the validity of a user for the client 110 prior to performing event notification operations. Pseudocode for the validity algorithm may be as follows:

```
internal bool IsValidUser(User user)
{
    Step 1a. If (Domain\Name) is specified, verify user exists
    (AD verification)
        ( Query based on domain\name )
        {
            return true;
        }
    else
        {
            return false;
        }
    Step 1b. If (Email) is specified, get user details (AD verifiction)
        ( Query based on Email )
        {
            Update User.DomainUser from AD information
            return true;
        }
    else
        {
            return false;
        }
    Step 1c. If (CN) is specified, get user details (AD information)
        (Query based on CN)
        {
            Update User.Name and User.Domain from AD information
            return true;
        }
    else
        {
            return false;
        }
}
```

In various embodiments, the event notification component 132 may send email with the change event to the client 110. Pseudocode for the email algorithm for a Simple Mail Transfer Protocol (SMTP) server from a MICROSOFT SHAREPOINT configuration may be as follows:

```
internal void SendEmail(string[ ] userAccount, string from, string subject,
string body,
System.Net.Mail.Attachment[ ] attachments)
{
    Step1. Get SMTP address, From address and Reply-To address from
    SPS
        If not configured any Error.
    Uses class Microsoft.SharePoint.Administration.SPGlobalAdmin
            MailFromAddress Property
            MailReplyToAddress Property
            OutboundStmpServer Property
    Step2. Use System.Web.Mail.SmtpMail to send email
    Reference :
            MailMessage myMail = new MailMessage();
            myMail.From = "from@microsoft.com";
            myMail.To = "to@microsoft.com";
            myMail.Subject = "UtilMailMessage001";
            myMail.Priority = MailPriority.Low;
            myMail.BodyFormat = MailFormat.Html;
            myMail.Body =
            "<html><body>UtilMailMessage001 -
success</body></html>";
            MailAttachment myAttachment
                = new
            MailAttachment("c:\attach\attach1.txt",
            MailEncoding.Base64);
            myMail.Attachments.Add(myAttachment);
            SmtpMail.SmtpServer = "MyMailServer";
            SmtpMail.Send(myMail);
    */
}
internal XmlElement ConvertEmailPayLoadToXml(string emailPayLoad)
{
    Step1. Verify emailPayLoad is valid XML.
            Error if not.
    Step2. Verify emailPayLoad confirms to Email PayLoad Schema
            Error if not.
    Step3. Convert string to XmlElement
            return XmlElement
```

In various embodiments, the event notification component 132 may send email with the change event to the client 110 using the following data scheme:

```
<?xml version="1.0" encoding="utf-8"?>
<s:schema
    elementFormDefault="qualified"
    xmlns="http://tempuri.org/XMLSchema.xsd"
    xmlns:mstns="http://tempuri.org/XMLSchema.xsd"
    xmlns:s="http://www.w3.org/2001/XMLSchema"
    xmlns:tns="Microsoft.OBA.LOBI.MidTier.Notification"
    targetNamespace="Microsoft.OBA.LOBI.MidTier.Notification"
    >
    <s:complexType name="EmailPayLoad">
        <s:sequence>
            <s:element minOccurs="0" maxOccurs="1" name="From"
                type="tns:Recipient"/>
            <s:element minOccurs="0" maxOccurs="1" name="Recipients"
                type="tns:ArrayOfRecipient"/>
            <s:element minOccurs="0" maxOccurs="1" name="Presentation"
                type="tns:Presentation"/>
            <s:element minOccurs="0" maxOccurs="1" name="Protection"
                type="tns:Protection"/>
        </s:sequence>
    </s:complexType>
<s:complexType name="Attachment">
    <s:sequence>
        <s:element minOccurs="0" maxOccurs="1" name="Data"
            type="s:base64Binary"/>
    </s:sequence>
```

-continued

```
    <s:attribute name="FileName" type="s:string"/>
    <s:attribute name="DisplayName" type="s:string"/>
    <s:attribute name="MimeType" type="s:string"/>
</s:complexType>
<s:complexType name="ArrayOfAttachment">
    <s:sequence>
        <s:element minOccurs="0" maxOccurs="unbounded"
            name="Attachment"
            nillable="true" type="tns:Attachment"/>
    </s:sequence>
</s:complexType>
<s:complexType name="Presentation">
    <s:sequence>
        <s:element minOccurs="0" maxOccurs="1" name="Body"
            type="s:string"/>
        <s:element minOccurs="0" maxOccurs="1" name="Attachments"
            type="tns:ArrayOfAttachment"/>
    </s:sequence>
    <s:attribute name="Subject" type="s:string"/>
</s:complexType>
<s:complexType name="ArrayOfRecipient">
    <s:sequence>
        <s:element minOccurs="0" maxOccurs="unbounded"
            name="Recipient"
            nillable="true" type="tns:Recipient"/>
    </s:sequence>
</s:complexType>
<s:complexType name="Recipient">
    <s:attribute name="Email" type="s:string"/>
    <s:attribute name="CN" type="s:string"/>
    <s:attribute name="DomainUser" type="s:string"/>
</s:complexType>
<s:complexType name="Protection">
    <s:sequence>
        <s:element minOccurs="1" maxOccurs="1" name="Starts"
            type="s:dateTime"/>
        <s:element minOccurs="1" maxOccurs="1" name="ValidUntil"
            type="s:dateTime"/>
        <s:element minOccurs="0" maxOccurs="1"
            name="EnterprisePolicyTemplate" type="s:string"/>
        <s:element minOccurs="0" maxOccurs="1"
            name="UserRights" type="tns:ArrayOfUserRight"/>
    </s:sequence>
</s:complexType>
<s:complexType name="ArrayOfUserRight">
    <s:sequence>
        <s:element minOccurs="0" maxOccurs="unbounded"
            name="UserRight" nillable="true"
            type="tns:UserRight"/>
    </s:sequence>
</s:complexType>
<s:complexType name="UserRight">
    <s:sequence>
        <s:element minOccurs="0" maxOccurs="1"
            name="Rights" type="tns:ArrayOfRight"/>
    </s:sequence>
    <s:attribute name="UserName" type="s:string"/>
</s:complexType>
<s:complexType name="ArrayOfRight">
    <s:sequence>
        <s:element minOccurs="0" maxOccurs="unbounded"
            name="Right"
            nillable="true" type="tns:Right"/>
    </s:sequence>
</s:complexType>
<s:complexType name="Right">
    <s:sequence>
        <s:element minOccurs="1" maxOccurs="1" name="Starts"
            type="s:dateTime"/>
        <s:element minOccurs="1" maxOccurs="1" name="ValidUntil"
            type="s:dateTime"/>
    </s:sequence>
    <s:attribute name="ActionPermitted" type="s:string"/>
</s:complexType>
</s:schema>
```

In various embodiments, the event notification component 132 implemented at the middle-tier can support user registration for various types of client devices. In one embodiment, for example, the user registration services are exposed as a middle-tier web service. A user registration database schema may include a UserRegistration table to keep user registration information, including a RegistrationId column of type INT and is the primary key for this table and an identity, a UserAccount column of type NVARCHAR (256) and represents the user account, a UserPlatform column of type NVARCHAR(64) and represents the name of the user platform, a CreatedBy column of type NVARCHAR(256) and represents who registered the user, and a CreatedDate column of type DATETIME and represents the date when the registration was done. The user registration database schema may further include a UserRegistrationHistory table to store user registration history, including a UserAccount column of type NVARCHAR(256) and represents the user account, a UserPlatform column of type NVARCHAR(64) and represents the name of the user platform, a CreatedBy column of type NVARCHAR(256) and represents who registered the user, a CreatedDate column of type DATETIME and represents the date when the registration was done, a RetiredBy column of type NVARCHAR(256) and represents who un-registered the user, and a RetiredDate column of type DATETIME and represents the date when the un-registration was done.

In various embodiments, the event notification component 132 may provide user registration service to notify users with a specified platform. Pseudocode for a user registration API may be illustrates as follows:

```
void Register(string platform, string userAccount)
void UnRegister(string platform, string userAccount)
string[ ] GetRegisteredUsers(string platform)
string GetPlatformForUser(string accountName)
```

Figure 3:
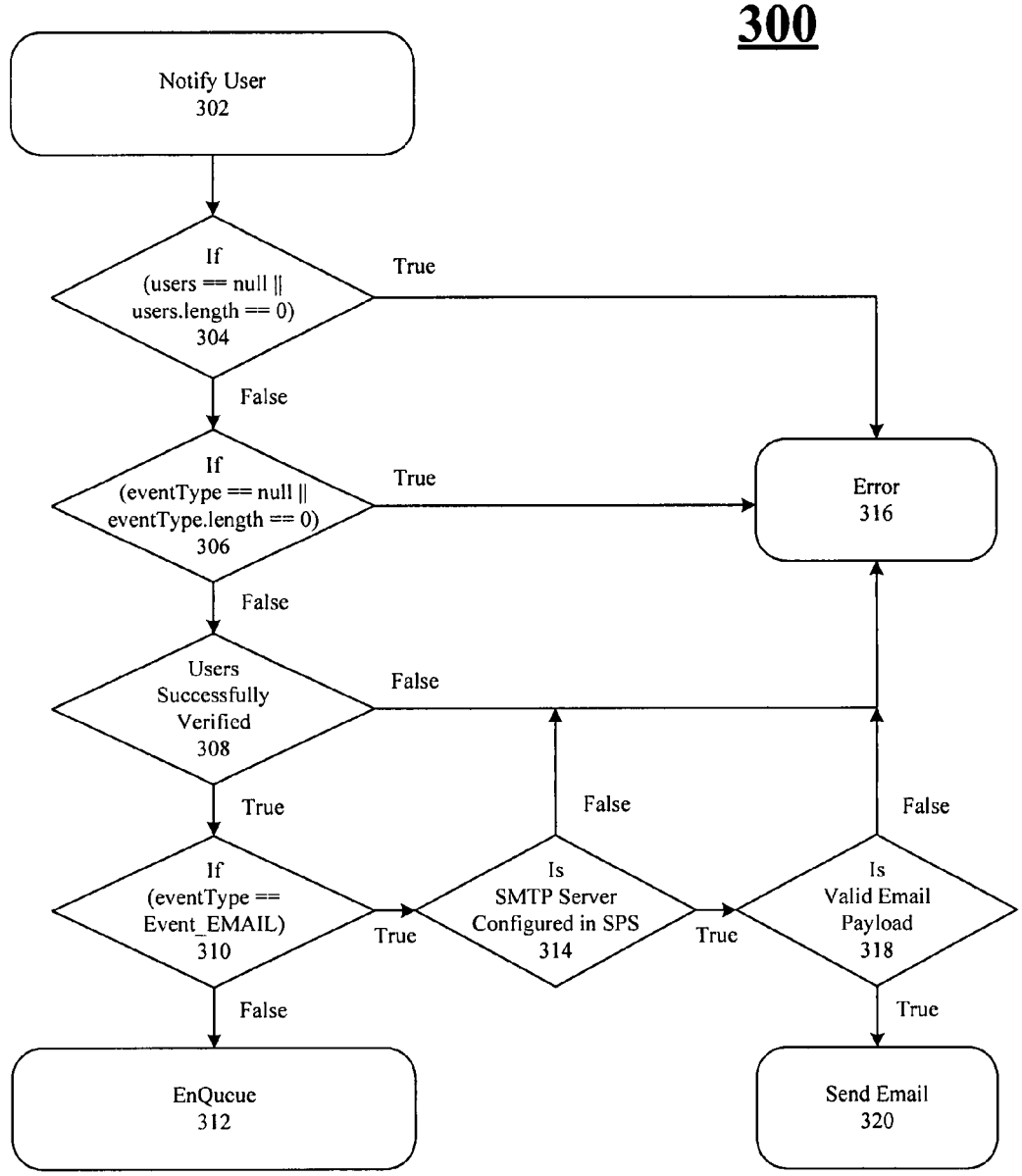
FIG. 3 illustrates one embodiment of a second logic flow.

FIG. 3 illustrates a logic flow 300. The logic flow 300 may be representative of the operations executed by one or more embodiments described herein, such as when notifying a user of a LEM 142-1-*m* via email. As shown in FIG. 3, the logic flow 300 may notify the user at block 302. If the expression (users==null||users.length==0) at diamond 304 is TRUE, then an error has occurred as indicated by block 316. If the expression (users==null||users.length==0) at diamond 304 is FALSE, then control passes to diamond 306.

If the expression (eventType==null||eventType.length==0) at diamond 306 is TRUE, then an error has occurred as indicated by block 316. If the expression (eventType==null||eventType.length==0) at diamond 306 is FALSE, then control passes to diamond 308.

If the test whether the users have been successfully verified at diamond 308 is FALSE, then an error has occurred as indicated by block 316. If the users have been successfully verified at diamond 308 is TRUE, then control passes to diamond 310.

If the expression (eventType==Event_EMAIL) at diamond 310 is FALSE, then enqueue operations occur at block 312. If the expression (eventType==Event_EMAIL) at diamond 310 is TRUE, then control is passed to diamond 314.

If the SMTP server is configured in SPS at diamond 314 is FALSE, then an error has occurred as indicated by block 316. If the SMTP server is configured in SPS at diamond 314 is TRUE, then control is passed to diamond 318.

If the valid email payload at diamond 318 is FALSE, then an error has occurred as indicated by block 316. If the test for whether the valid email payload at diamond 318 is TRUE, then an email is sent at block 320.

The event notification techniques may include various design goals that provide several advantages with respect to conventional techniques. For example, the event notification techniques may define generic LOB event interfaces for LOB event agents to submit events for an office business entity (OBE). The event notification techniques may define generic LOB event interfaces for email notifications from LOB systems. The event notification techniques may allow a LOB system to specify target users for notification. The event notification techniques may support attachments in email notification. The event notification techniques may host the notification services on a MICROSOFT SHAREPOINT server. The event notification techniques may host a LOB event agent. The event notification techniques may specify message protection for event notifications. The event notification techniques may create and queue LOB event messages. The event notification techniques may support legacy clients using a user registration interface. The event notification techniques may allow a LOB system to specify particular LOB system information. The event notification techniques may dispatch events to other event agents based on registered user. The event notification techniques may support event notification for untargeted users. Finally, the event notification techniques may manage explicit event subscriptions. Other design goals and advantages may be described as well.

Figure 4:
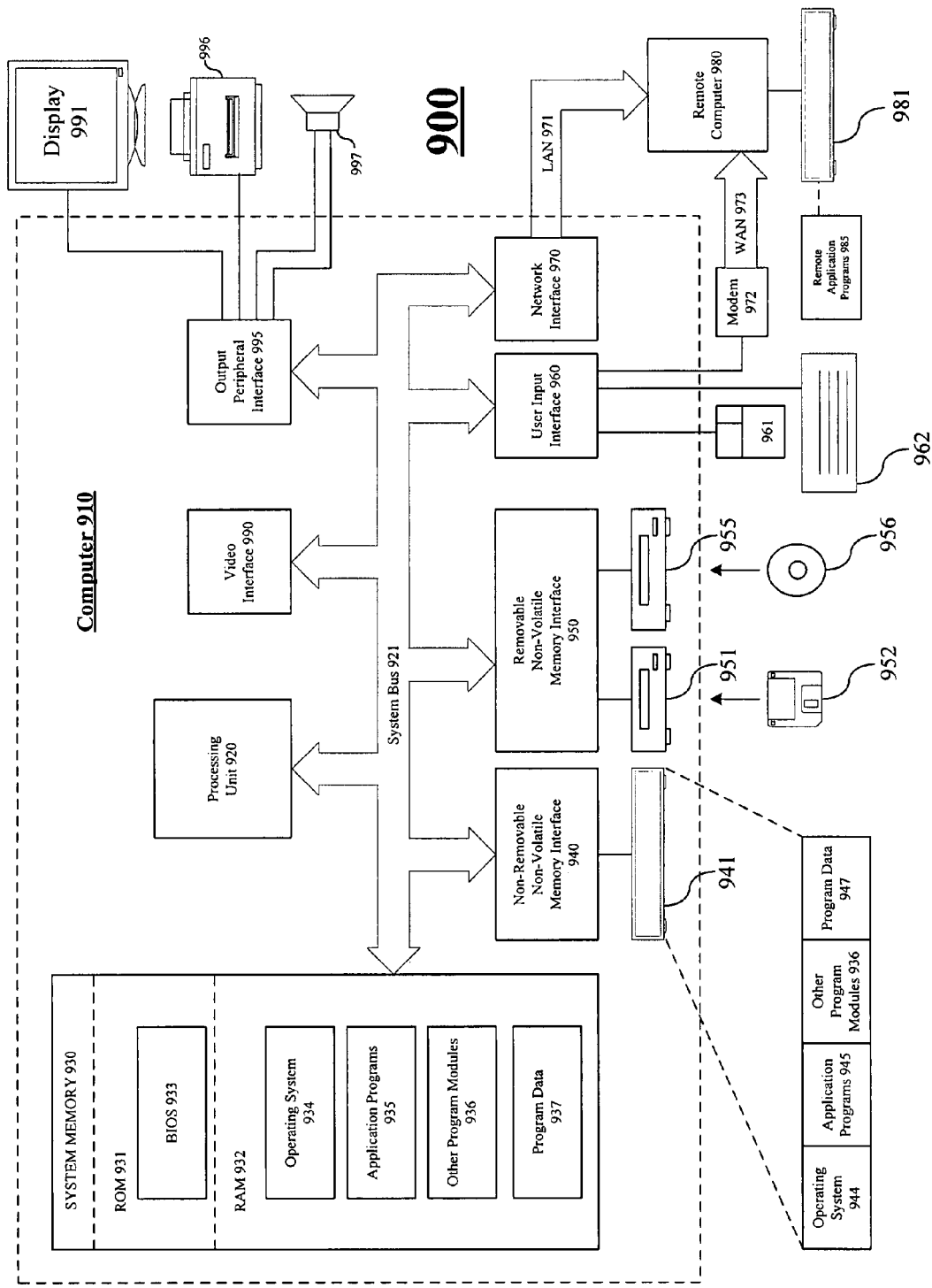
FIG. 4 illustrates one embodiment of a computing system architecture.

FIG. 4 illustrates a block diagram of a computing system architecture 900 suitable for implementing various embodiments, including the various elements of the event notification system 100. It may be appreciated that the computing system architecture 900 is only one example of a suitable computing environment and is not intended to suggest any limitation as to the scope of use or functionality of the embodiments. Neither should the computing system architecture 900 be interpreted as having any dependency or requirement relating to any one or combination of components illustrated in the exemplary computing system architecture 900.

Various embodiments may be described in the general context of computer-executable instructions, such as program modules, being executed by a computer. Generally, program modules include any software element arranged to perform particular operations or implement particular abstract data types. Some embodiments may also be practiced in distributed computing environments where operations are performed by one or more remote processing devices that are linked through a communications network. In a distributed computing environment, program modules may be located in both local and remote computer storage media including memory storage devices.

As shown in FIG. 4, the computing system architecture 900 includes a general purpose computing device such as a computer 910. The computer 910 may include various components typically found in a computer or processing system. Some illustrative components of computer 910 may include, but are not limited to, a processing unit 920 and a memory unit 930.

In one embodiment, for example, the computer 910 may include one or more processing units 920. A processing unit 920 may comprise any hardware element or software element arranged to process information or data. Some examples of the processing unit 920 may include, without limitation, a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, the processing unit 920 may be implemented as a general purpose processor. Alternatively, the processing unit 920 may be implemented as a dedicated processor, such as a controller, microcontroller, embedded processor, a digital signal processor (DSP), a network processor, a media processor, an input/output (I/O) processor, a media access control (MAC) processor, a radio baseband processor, a field programmable gate array (FPGA), a programmable logic device (PLD), an application specific integrated circuit (ASIC), and so forth. The embodiments are not limited in this context.

In one embodiment, for example, the computer 910 may include one or more memory units 930 coupled to the processing unit 920. A memory unit 930 may be any hardware element arranged to store information or data. Some examples of memory units may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), EEPROM, Compact Disk ROM (CD-ROM), Compact Disk Recordable (CD-R), Compact Disk Rewriteable (CD-RW), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk (e.g., floppy disk, hard drive, optical disk, magnetic disk, magneto-optical disk), or card (e.g., magnetic card, optical card), tape, cassette, or any other medium which can be used to store the desired information and which can accessed by computer 910. The embodiments are not limited in this context.

In one embodiment, for example, the computer 910 may include a system bus 921 that couples various system components including the memory unit 930 to the processing unit 920. A system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, and so forth. The embodiments are not limited in this context.

In various embodiments, the computer 910 may include various types of storage media. Storage media may represent any storage media capable of storing data or information, such as volatile or non-volatile memory, removable or non-removable memory, erasable or non-erasable memory, writeable or re-writeable memory, and so forth. Computer readable media may include storage media adapted for reading and writing to a computing system, such as the computing system architecture 900. Examples of computer readable media for computing system architecture 900 may include, but are not limited to, volatile and/or nonvolatile memory such as ROM 931 and RAM 932. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio-frequency (RF) spectrum, infrared and other wireless media. Combinations of the any of the above should also be included within the scope of computer readable media.

In various embodiments, the memory unit 930 includes computer storage media in the form of volatile and/or nonvolatile memory such as ROM 931 and RAM 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 4 illustrates operating system 934, application programs 935, other program modules 936, and program data 937.

The computer 910 may also include other removable/non-removable, volatile/nonvolatile computer storage media. By way of example only, FIG. 4 illustrates a hard disk drive 940 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media discussed above and illustrated in FIG. 4, provide storage of computer readable instructions, data structures, program modules and other data for the computer 910. In FIG. 4, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies. A user may enter commands and information into the computer 910 through input devices such as a keyboard 962 and pointing device 961, commonly referred to as a mouse, trackball or touch pad. Other input devices (not shown) may include a microphone, joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A monitor 991 or other type of display device is also connected to the system bus 921 via an interface, such as a video interface 990. In addition to the monitor 991, computers may also include other peripheral output devices such as speakers 997 and printer 996, which may be connected through an output peripheral interface 990.

The computer 910 may operate in a networked environment using logical connections to one or more remote computers, such as a remote computer 980. The remote computer 980 may be a personal computer (PC), a server, a router, a network PC, a peer device or other common network node, and typically includes many or all of the elements described above relative to the computer 910, although only a memory storage device 981 has been illustrated in FIG. 4 for clarity. The logical connections depicted in FIG. 4 include a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other technique suitable for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 4 illustrates remote application programs 985 as residing on memory device 981. It will be appreciated that the network connections shown are exemplary and other techniques for establishing a communications link between the computers may be used. Further, the network connections may be implemented as wired or wireless connections. In the latter case, the computing system architecture 900 may be modified with various elements suitable for wireless communications, such as one or more antennas, transmitters, receivers, transceivers, radios, amplifiers, filters, communications interfaces, and other wireless elements. A wireless communication system communicates information or data over a wireless communication medium, such as one or more portions or bands of RF spectrum, for example. The embodiments are not limited in this context.

Some or all of the managed taxonomy entity model system 100 and/or computing system architecture 900 may be implemented as a part, component or sub-system of an electronic device. Examples of electronic devices may include, without limitation, a processing system, computer, server, work station, appliance, terminal, personal computer, laptop, ultra-laptop, handheld computer, minicomputer, mainframe computer, distributed computing system, multiprocessor systems, processor-based systems, consumer electronics, programmable consumer electronics, personal digital assistant, television, digital television, set top box, telephone, mobile telephone, cellular telephone, handset, wireless access point, base station, subscriber station, mobile subscriber center, radio network controller, router, hub, gateway, bridge, switch, machine, or combination thereof. The embodiments are not limited in this context.

In some cases, various embodiments may be implemented as an article of manufacture. The article of manufacture may include a storage medium arranged to store logic and/or data for performing various operations of one or more embodiments. Examples of storage media may include, without limitation, those examples as previously provided for the memory unit 130. In various embodiments, for example, the article of manufacture may comprise a magnetic disk, optical disk, flash memory or firmware containing computer program instructions suitable for execution by a general purpose processor or application specific processor. The embodiments, however, are not limited in this context.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. It is worthy to note that although some embodiments may describe structures, events, logic or operations using the terms "first," "second," "third," and so forth, such terms are used merely as labels, and are not intended to impose numerical requirements on their objects. Further, such terms are used to differentiate elements and not necessarily limit the structure, events, logic or operations for the elements.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
   receiving at a server, from a line of business application program, a message indicating a change event for line of business data;
   converting said change event to a defined line of business entity event, the defined line of business entity event having at least one of a data schema, syntax rule, data format or protocol that is different from a data schema, syntax rule, data format or protocol, respectively, of the change event, the defined line of business entity event to comprise a standardized event understandable by a client;
   sending said entity event to a line of business notification service;
   generating a line of business event message for said entity event; and storing said event message at the server, in a user event queue for a given client.

2. The method of claim 1, comprising notifying a client device of said entity event.

3. The method of claim 1, comprising sending said event message to a client device.

4. The method of claim 1, comprising receiving a request for event messages for a client device.

5. The method of claim 1, comprising sending said event message to a client device as an electronic mail message.

6. The method of claim 1, comprising creating an entity view instance in a client data store for said entity event.

7. The method of claim 1, comprising processing said line of business event message by an event handler for an application program.

8. An article comprising a storage medium containing instructions that if executed enable a system to:
   receive at a server, from a line of business application program, a line of business message indicating a change event;
   convert said line of business message to a defined line of business entity event, the defined line of business entity event having at least one of a data schema, syntax rule, data format or protocol that is different from a data schema, syntax rule, data format or protocol, respectively, of the change event, the defined line of business entity event to comprise a standardized event understandable by a client;
   send said entity event to a line of business notification service;
   generate a line of business event message for said entity event; and
   store said event message at the server, in a user event queue for a given client.

9. The article of claim 8, further comprising instructions that if executed enable the system to notify a client device of said entity event.

10. The article of claim 8, further comprising instructions that if executed enable the system to send said event message to a client device.

11. The article of claim 8, further comprising instructions that if executed enable the system to receive a request for event messages for a client device.

12. The article of claim 8, further comprising instructions that if executed enable the system to send said event message to a client device as an electronic mail message.

13. The article of claim 8, further comprising instructions that if executed enable the system to create an entity view instance in a client data store for said entity event.

14. The article of claim 8, further comprising instructions that if executed enable the system to process said line of business event message by an event handler for an application program.

15. An apparatus comprising:
   a server having an event notification component, said event notification component having an event agent component to receive a message from a line of business application program indicating a change event for line of business data and convert said change event to a defined line of business entity event, wherein the defined line of business entity event having at least one of a data schema, syntax rule, data format or protocol that is different from a data schema, syntax rule, data format or protocol, respectively, of the change event, the defined line of business entity event to comprise a standardized event understandable by a client, a notification service component to generate a line of business event message for said entity event, and an event database to store said event message in a user event queue for a given client.

16. The apparatus of claim 15, said notification service component to notify a client device of said entity event.

17. The apparatus of claim 15, said notification service component to send said event message to a client device in response to a request from said client device.

18. The apparatus of claim 15, said notification service component to send said event message to a client device as an electronic mail message.

19. The apparatus of claim 15, comprising an application program event handler to process said event message for an application program on a client device.

20. The apparatus of claim 15, comprising a database event handler to process said event message for a client data store for a client device.

* * * * *